Figure 1:
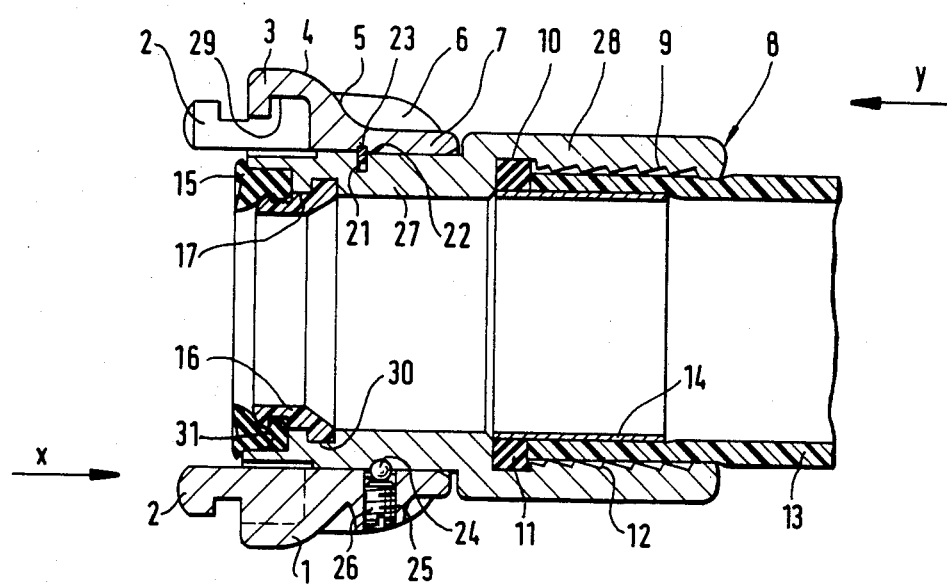

United States Patent [19]

Ebert

[11] Patent Number: 4,524,997
[45] Date of Patent: Jun. 25, 1985

[54] HOSE COUPLING

[75] Inventor: Karl Ebert, Giengen, Fed. Rep. of Germany

[73] Assignee: Max Widenmann Armaturenfabrik, Giengen, Fed. Rep. of Germany

[21] Appl. No.: 589,873

[22] Filed: Mar. 15, 1984

[30] Foreign Application Priority Data

Mar. 17, 1983 [DE] Fed. Rep. of Germany ... 8307717[U]

[51] Int. Cl.³ .............................................. F16L 33/20
[52] U.S. Cl. ..................................... 285/74; 285/258; 285/362; 285/380
[58] Field of Search .................. 285/74, 73, 379, 380, 285/258, 362, 336, 388

[56] References Cited

U.S. PATENT DOCUMENTS

| 175,232 | 3/1876 | Work et al. | 285/258 X |
| 744,505 | 11/1903 | Dixon | 285/380 |
| 922,132 | 5/1909 | Gold | 285/380 |
| 1,838,313 | 12/1931 | Kohr | 285/258 X |
| 2,253,018 | 8/1941 | Cowles | 285/388 X |
| 2,386,109 | 10/1945 | Glessner | 285/379 X |

FOREIGN PATENT DOCUMENTS

| 166758 | 1/1906 | Fed. Rep. of Germany | 285/74 |
| 2207997 | 9/1973 | Fed. Rep. of Germany | 285/74 |
| 399923 | 5/1909 | France | 285/380 |
| 1396564 | 3/1965 | France | 285/74 |
| 221948 | 9/1924 | United Kingdom | 285/74 |

Primary Examiner—Thomas F. Callaghan
Attorney, Agent, or Firm—Toren, McGeady, Stanger

[57] ABSTRACT

A hose coupling for connecting lengths of fire hose is formed by coupling halves. Each coupling half includes a hose connection piece and a cam ring rotatable relative to the hose connection piece. The cam rings provide a bayonet-type locking engagement. The hose connection piece has two serially arranged axially extending sections each of different diameters. The larger diameter section receives and holds a length of the fire hose. A neck on the cam ring is rotatably attached to the smaller diameter section. The neck on the cam ring is held on the smaller diameter section against movement in the axial direction. A resilient back-springing holding ring is located adjacent the free end of a smaller diameter section in a recess in the section. The holding ring in combination with the free end of the smaller diameter section forms an annular space in which a sealing ring for the coupling is secured.

7 Claims, 3 Drawing Figures

HOSE COUPLING

The invention is directed to a hose coupling, particularly for fire extinguishing hoses, whose halves have cam rings which are rotatable relative to the hose connection piece assigned to every half and whose cams can be made to engage in a bayonet-type locking engagement with annular grooves of the cam ring of the other respective coupling half, which annular grooves have a slope, whereupon the turning of the cam rings causes the hose connection pieces to draw together axially, so that sealing rings arranged in their end faces are pressed axially against one another without reciprocal turning; and in which the hose connection pieces are adjusted for inner fastening, for which purpose an expandable clamping ring is provided which holds the hose in contact with the inner wall of the fastening connection piece after the clamping ring expands.

Such couplings have long been known as "Storz couplings" and have been standardized with respect to connection dimensionings. In the known couplings the cam rings have inwardly directed annular ribs serving as stops for hose connection pieces to be inserted into the ring from the coupling opening, which stops receive the axial forces. A result of this was, first, that the inserted part of a hose connection piece had to have an outer diameter smaller than the inner diameter of the inwardly projecting annular rib formed by the cam ring. If one wanted to connect connection pieces with these cam rings whose diameter was as large as that of the cylinder defined by the inner surfaces of the cams without enlarging the outer diameter of the cam rings standardized for determined hose diameters and without enlarging the diameter of the cylinder defined by the insides of the cams, then one composed the hose connection pieces from two parts screwed together in the axial direction, one of which parts was introduced into the cam ring from the cam side, the other part being introduced into the cam ring from the opposite side, as is shown, e.g. by brochure no. 55 of the applicant from September 1964, FIG. 113. The connection pieces composed of two parts brought about sealing problems. They were also often difficult to detach after extended use. In every case, the likewise standardized coupling sealing ring was received in the end face of the connecting connection piece or of the front connection piece part. In addition to hoses to be attached on the connecting connection pieces (outer fastening), such couplings were also already used with hoses to be fastened inside in the hose connection pieces (inner fastening) as was suggested in the German Utility Model 1 785 847, where only the hose connection pieces with inner fastening were shown without the respective coupling rings. Significantly, it is established in the latter text that when using standardized cam parts for a determined hose size the throughpass width of the cam parts is not sufficient if the connection piece is to retain the material thickness required for the inner fastening, so that for these cases, as for the inner fastening connection piece, the two-part construction was suggested. In so doing, it was presupposed (FIG. 2 of the cited text) that the front connection piece part could have the same diameter continuously and the coupling sealing ring could be accommodated within a wall thickness which was small in relation to the diameter, while, in currently used couplings, it has a larger wall thickness sufficient for receiving the standardized coupling sealing ring. This results in a narrowing of the input cross-section if the inner fastening of hoses of the largest possible diameter is to be made possible. This in turn impedes the use of the known devices for expanding the clamping ring for inner fastening, which devices are adapted to a coupling of standardized connection dimensionings and have mandrels of correspondingly larger diameters; but the desire still remains to continue to employ the previous expanding tools as they are assigned to the couplings of determined connection dimensionings, as it is also desired to carry out particular constructions of the coupling in such a way that the cooperation with coupling halves of known constructional types is not impeded.

As can be seen from the DE-OS 31 10 212, the applicant himself has already constructed a coupling for large hose diameters in a manner which can also be used for inner fastening and in such a way that the previous inner annular rib of the cam rings on the diameter of the cylinder defined by the insides of the cams was reduced and the required stop shoulder was formed by means of a groove in which the connection piece, with collar ring parts attached on its outer casing, was to be inserted in a bayonet-type locking engagement similar to the interlocking of the cam rings. For this purpose, the connection piece had to retain these outer collar ring sections; in its employment for the inner fastening of hoses of large diameter a narrowing would have resulted here as well because the coupling sealing ring is received in the front end of the fastening connection piece, which narrowing would have impeded the use of the fitting expanding devices for the clamping ring of the hose to be fastened inside.

Accordingly, the object upon which the invention is based is to provide a coupling in which a one-piece fastening connection piece, having no sealing problems, is used, which fastening connection piece is suited for the inner fastening of hoses of a diameter which is larger in relation to the connection dimensionings of the coupling and to provide this for thin-walled hoses as well as for hoses composed of several woven layers, wherein the outer diameter of the fastening connection piece is larger in the area where it receives the hose than the diameter of the cylinder defined by the cam inner surfaces, without impairing the turning ability of the cam ring relative to the connection piece and while retaining the possibility of connecting a coupling half of the type constructed according to the invention with coupling halves of a known constructional type, in addition to retaining the coupling sealing ring standardized for determined connection dimensionings and while maintaining the possibility of carrying out the expansion of the clamping rings for the inner fastening with the known devices assigned to the connection diameter of the coupling.

This object is met, according to the invention, in that a one-piece fastening connection piece is employed which has two sections of different diameter, namely a rear section of larger inner and outer diameter, which receives the hose, and a front section of smaller inner and outer diameter; in that the neck of the cam ring is rotatably attached on the front section with an inner diameter which is constant along this section; in that the cam ring is held on the front section of the fastening connection piece against movement in the axial direction in a manner allowing it to turn by means of locking means engaging simultaneously in an annular groove of the front connection piece section and in an annular groove in the neck of the cam ring, which locking means are employed as particular structural component parts; and in that a springing holding ring catches in an annular groove of the front section of the fastening connection piece, which holding ring, together with a recess on the end face in the front section, forms a shaped annular space for receiving the sealing ring of the coupling on the end face.

Since the inner annular rib in the cam rings is dispensed with, the desired relations of the inner widths for large hose diameters are achieved. The fastening connection piece for the inner fastening remains one piece so that sealing and detaching problems do not occur. The connection piece retains the material thickness required for inner fastening. A narrowing of the through-passage due to the receiving of the coupling sealing ring in the end face of the connection piece is avoided during the introduction of an expanding device for the clamping ring of the inner fastening in that the shaped annular space for receiving the coupling sealing ring, which retains the dimensionings standardized for the connection dimensionings in question and the standardized profile, is provided by means of using a special holding ring following the expansion.

A further development of the invention pursues the object of constructing a coupling, constructed according to the invention, with respect to its external physical boundaries in such a way that it does not get caught when the hose, with coupling, is pulled over projecting railings, edges, walls or the like, wherein, however, the construction should be such that the handling of the coupling halves is good when they are connected with one another or detached from one another.

This purpose is served when the neck of the cam ring has the same outer diameter as the rear section of the fastening connection piece, when, furthermore, the ribs of the cam ring are rounded in their transition toward the end of the neck and, finally, when a front collar ring part of the cam ring, which collar ring part contains an annular groove serving to receive the cams of a counter-ring, is spherically rounded on its outside and passes into the neck and the ribs with a conical surface.

Details follow from the following description of an embodiment example in connection with the drawing and the subclaims.

Figure 2:
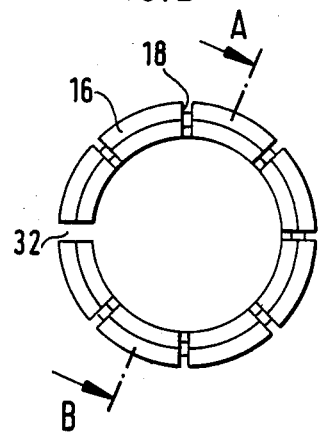
Figure 3:
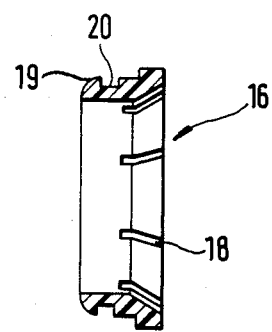

FIG. 1 is a section through a half of a coupling constructed according to the invention, FIG. 2 is a frontal view of a holding ring and FIG. 3 is a section according to line A—B in FIG. 2.

In the example in the drawing the cam ring 1 of a coupling half has two diametrically opposite hook-shaped cams 2. In FIG. 1, above, the cam 2 is not shown in section in order to clearly show the annular groove 29 arranged in the cam ring and the collar ring 3 defining it outwardly. The collar ring 3 has cut out portions in which the cams 2 of a counter-ring can be inserted and so introduced in the annular groove 29 for the purpose of a bayonet-type locking engagement. The outer surface of the collar ring 3 is spherically constructed so that the transition line 4, which is rounded in cross-section, extends toward the neck 7 of the cam ring 1. Ribs 6, which are also very rounded toward the neck 7, are attached on the neck 7. The rounding according to line 4 passes into a conical surface 5.

The one-piece fastening connection piece 8, constructed for inner fastening of a hose 13, has two sections of different diameter, namely a rear section 28 of a larger inner and outer diameter which receives the hose 13 and a front section 27 of a smaller inner and outer diameter on which the neck 7 of the cam ring 1 is rotatably attached with an inner diameter which is constant along this section. The generated surface of the recess 12, which is formed in the inside of the section 28 of the fastening connection piece 8 and which serves to receive the hose, is provided with grooves 9 which are saw tooth-shaped in cross-section. An annular groove 10 is provided in front of a shoulder formed by the adjoining front part 27 of the fastening connection piece 8 at the end of the recess 12 facing the cam ring, at which annular groove 10 the grooves 9 end and in which a sealing ring 11 is inserted which is contacted by the front end of the hose 13. In the area of the sealing ring 11 and the grooves 9 the hose is pressed outwardly by means of an expanded clamping ring 14 inserted in the latter, so that the hose material is pressed into the grooves 9, contrary to the drawing, and the hose is secured against being pulled out of the fastening connection piece 8.

A resiliently back-springing holding ring 16 is inserted in a groove 30 attached in the vicinity of the front end of the front section 27 of the fastening connection piece 8, which section 27 rotatably carries the cam ring 1. Together with a recess 31 provided on the end face at the front end of the part 27, the ring 16 forms a shaped annular space for receiving the coupling sealing ring 15 whose shaping and dimensionings are standardized and which was inserted directly in the end face of the connection piece or of a connection piece part in the known constructional types. The holding ring 16 has a plurality of longitudinal slots 18 and a separating slot 32 which makes possible the resilient pressing together of the ring 16. In the construction drawn in FIG. 1, above, the cam ring 1 is secured on the front section 27 of the fastening connection piece 8 against axial displacement by means of a springing-apart, slotted locking ring 22. The latter engages in an outer groove 21 on the section 27, as well as in an inner groove 23 of the same cross-section, which inner groove 23 is arranged in the neck 7. From other technical areas of application it is known that such connections can, with a suitable selection of working material and of the cross-sections, be easily constructed in such a way that they can securely absorb shearing forces acting in the axial direction of an order of magnitude such as occurs in couplings of the type described.

Locking balls 24 may be employed in place of the locking ring 22 as locking elements, as shown in FIG. 1, below, which engage in an outer groove, corresponding to the groove 21, arranged in the connection piece front section 27, but which simultaneously engage in a borehole 25, which is arranged as a threaded borehole in an eye provided on the neck 7 of the cam ring, or in one of the ribs 6 and is closed by means of a screw 26 which holds the ball 24 at a suitable depth. On the circumference of the front connection piece section 27 a plurality of such locking balls are accommodated, so that the occurring axial forces are again absorbed but the turning of the cam ring 1 on the front connection piece section 27 is not impeded.

The fastening of the hose and the assembly of the coupling half are carried out in the following manner.

The point of departure of the present invention is the fastening connection piece 8, in whose front section 27 the holding ring 16 and the coupling sealing ring 15 are not yet inserted; that is, the fastening connection piece 8 is open, without being narrowed, at the left end in FIG. 1. The sealing ring 11 is inserted in the annular groove 10 of the recess 12 of the rear connection piece section 28 and the hose 13 is pushed into the recess 12 until it contacts the sealing ring 11.

In order to fasten the hose one can work with that fastening device assigned to a coupling of the size standardized with respect to the connection dimensionings, since the connection piece is open at left without being narrowed. The clamping ring 14, whose diameter is first somewhat smaller than the inner width of the front connection piece section 27, is placed on the mandrel of the fastening device. With the aid of the fastening device the clamping ring 14 is first introduced with this smaller outer diameter in the direction of the arrow x into the hose 13, wherein the fastening device is adjusted in such a way that the clamping ring obtains an axial position in which it contacts in front of the shoulder formed in the inside of the fastening connection piece after expanding. Next, the clamping ring 14 is expanded far enough that its inner diameter corresponds to the inner width of the front connection piece section 27, wherein the hose material is pressed radially outward into the grooves 9. After this, the fastening device is again removed from the connection piece. Next, the holding ring 16, which is first resiliently pressed together, is inserted in the annular groove 30 in which it springs apart until it contacts this groove. The coupling sealing ring 15 is then inserted in the annular space now formed between the holding ring and recess 31. In the embodiment according to FIG. 1, above, the clamping ring 22 is then inserted in the annular groove 21 on the connection piece front part 27 and is pressed in far enough so that the front section 27 of the connection piece with the locking ring 22 located in the groove 21 can be pushed in the direction of arrow y into the neck 7 of the cam ring 1 until it catches in the inner groove 23 provided in the latter. In the embodiment according to FIG. 1, below, the front section 27 of the connection piece is pushed into the cam ring 1 far enough so that the groove, corresponding to the groove 21, which is to receive the balls 24, lies in front of the boreholes 25 in a well-fitting manner. Then, every individual ball 24 is inserted and secured by means of a screw 26.

Instead of the balls held by means of screws, extensions of screw bolts adapted to the groove cross-section could serve the same purpose.

The compressibility of the holding ring 16 can be improved in that the ring is produced from plastics material and the longitudinal slots 18 are provided in sufficient quantity.

I claim:

1. Hose coupling, particularly for fire extinguishing hoses, whose halves have cam rings which are rotatable relative to hose connection pieces assigned to each said half and whose cams can be made to engage in a bayonet-type locking engagement with an annular groove of said cam ring of the other respective said coupling half, said annular groove being sloped, whereupon the turning of said cam rings causes said hose connection pieces to draw together axially so that sealing rings arranged in their end faces are pressed against one another axially without reciprocal turning and in which said hose connection pieces are adjusted for inner fastening, for which purpose an expandable clamping ring is provided, which holds said hose in contact with the inner wall of the fastening connection piece after its expansion, characterized in that a one-piece fastening connection piece 8 is used which has two sections of different diameter, namely one rear section 28 of a larger inner and outer diameter, which section 28 receives said hose, and a front section 27 of a smaller inner and outer diameter; in that the neck 7 of said cam ring 1 is rotatably attached on said front section 27 with an inner diameter which is constant along said sections; in that said cam ring 1 is held on said front section 27 of said fastening connection piece 8 against movement in the axial direction in a manner allowing it to turn by means of locking means 22; 24 engaging simultaneously in an annular groove 21 of said front connection piece section 27 and in an annular groove 23 in said neck 7 of said cam ring 1, which locking means 23; 24 are employed as particular structural component parts; and in that a springing holding ring 16 catches in an annular groove 30 of said front section 27 of said fastening connection piece 8, which holding ring 16, together with a recess 31 on the end face in said front section 27, forms a shaped annular space for receiving the sealing ring 15 of said coupling on said end face.

2. Coupling according to claim 1, characterized in that said holding ring 16 is produced from plastics material and has a separating slot 32, as well as an axial slot 18 extending along a part of its depth.

3. Coupling according to claim 1, characterized in that an outwardly springing locking ring 22 is used as said locking means.

4. Coupling according to claim 1, characterized in that fitting pieces, e.g. balls 24, are employed as locking means from said cam ring 1 in said outer annular groove 21 of said front section 27 of said fastening connection piece 8 and are simultaneously held in said cam ring 1.

5. Coupling according to claim 1, characterized in that said neck 7 of said cam ring ring 1 has the same outer diameter as said rear section 28 of said fastening connection piece 8.

6. Coupling according to claim 4 with ribbed neck of said cam ring, characterized in that said ribs 6 of said cam ring 1 pass into the end of said neck 7 in a rounded manner.

7. Coupling according to claims 4 or 5, characterized in that a front collar ring part 3 of said cam ring 1, which collar ring part 3 contains an annular groove 29 serving to receive said cams 2 of a counter-ring, is spherically rounded on its outer side and passes into said neck 7 and said ribs 6 with a conical surface 5.

* * * * *